United States Patent
Kerr et al.

(10) Patent No.: US 12,430,116 B2
(45) Date of Patent: Sep. 30, 2025

(54) EXTERNAL DISTRIBUTED STORAGE LAYER UPGRADE

(71) Applicant: NetApp Inc., San Jose, CA (US)

(72) Inventors: Brendan Kerr, San Jose, CA (US); Avesh Kumar Agarwal, Cary, NC (US); Christopher Alan Busick, Littleton, MA (US); Christopher Lee Cason, Boulder, CO (US); Kyle Gene Knutson, Boulder, CO (US); Mohinish Vinnakota, Santa Clara, CA (US)

(73) Assignee: NetApp, Inc., San Jose, CA (US)

( * ) Notice: Subject to any disclaimer, the term of this patent is extended or adjusted under 35 U.S.C. 154(b) by 324 days.

(21) Appl. No.: 18/091,421

(22) Filed: Dec. 30, 2022

(65) Prior Publication Data
US 2024/0220227 A1    Jul. 4, 2024

(51) Int. Cl.
G06F 9/44 (2018.01)
G06F 8/65 (2018.01)
G06F 9/50 (2006.01)

(52) U.S. Cl.
CPC .............. G06F 8/65 (2013.01); G06F 9/5083 (2013.01)

(58) Field of Classification Search
CPC ................................. G06F 8/65; G06F 9/5083
See application file for complete search history.

(56) References Cited

U.S. PATENT DOCUMENTS

| | | | |
|---|---|---|---|
| 10,528,382 B2 | 1/2020 | CaraDonna et al. | |
| 2013/0275944 A1* | 10/2013 | Keller | G06F 8/73 717/123 |
| 2014/0059533 A1* | 2/2014 | Calder | H04L 41/082 717/171 |
| 2017/0115978 A1* | 4/2017 | Modi | G06F 8/65 |
| 2019/0026097 A1* | 1/2019 | Jebbar | G06F 9/44505 |

(Continued)

OTHER PUBLICATIONS

ONTAP software upgrade methods; Sep. 29, 2023; 4 Pgs.

(Continued)

*Primary Examiner* — Bradley A Teets
*Assistant Examiner* — Lenin Paulino
(74) *Attorney, Agent, or Firm* — Cooper Legal Group, LLC

(57) ABSTRACT

Techniques are provided for upgrading an external distributed storage layer that provides storage services to containerized applications hosted within a container hosting platform. An operator within the container hosting platform is custom configured to orchestrate, from within the container hosting platform, the upgrade for the external distributed storage layer. Because the external distributed storage layer and the container hosting platform are separate computing environment that utilize different namespaces, semantics, operating states, and/or application programming interfaces, a cluster controller within the container hosting platform is custom configured to reformat/translate commands between the external distributed storage layer and the container hosting platform for performing the upgrade. Because the external distributed storage layer upgrade may be part of an overall upgrade that upgrades the containerized applications hosted within the container hosting platform, the operator and cluster controller provide a single upgrade orchestration point for perform both upgrades in an orchestrated manner.

20 Claims, 13 Drawing Sheets

(56) References Cited

U.S. PATENT DOCUMENTS

| | | | |
|---|---|---|---|
| 2021/0173853 A1* | 6/2021 | Haven | G06F 16/275 |
| 2021/0200814 A1* | 7/2021 | Tal | G06F 16/90335 |
| 2022/0291913 A1* | 9/2022 | Antinori | G06F 8/65 |
| 2023/0025529 A1* | 1/2023 | Fu | G06F 9/4406 |
| 2023/0058369 A1 | 2/2023 | Hayes et al. | |
| 2023/0120785 A1* | 4/2023 | Kaimal | H04L 67/141 |
| | | | 718/1 |
| 2023/0342267 A1* | 10/2023 | Pabón | G06F 21/00 |

OTHER PUBLICATIONS

Prerequisites for Upgrading the vCenter Server Appliance; Mar. 15, 2023; 3 Pgs.

Notice of Allowance mailed on Jun. 3, 2025 for U.S. Appl. No. 18/091,421, filed Dec. 30, 2022, 08 pages.

\* cited by examiner

EXTERNAL DISTRIBUTED STORAGE LAYER UPGRADE

TECHNICAL FIELD

Various embodiments of the present technology relate to upgrading an external distributed storage layer. More specifically, some embodiments relate to orchestrating, from within a container hosting platform, an upgrade of an external distributed storage layer external and separate from the container hosting platform.

BACKGROUND

Historically, developers have built applications designed to be run on a single platform. This makes resource allocation and program execution simple and straight forward. For example, an application may be hosted on a server, and thus the application may utilize memory, storage, and processor resources of the server. The application may be defined using a particular programming language and paradigm/model supported by the server. However, building and deploying these types of applications is no longer desirable in most instances as many modern applications often need to efficiently and securely scale (potentially across multiple platforms) based on demand. There are many options for developing scalable, modern applications. Examples include, but are not limited to, virtual machines, microservices, and containers. The choice often depends on a variety of factors such as the type of workload, available ecosystem resources, need for automated scaling, compatible programming language and paradigm/model, and/or execution preferences.

When developers select a containerized approach for creating scalable applications, portions (e.g., microservices, larger services, etc.) of the application are packaged into containers. Each container may comprise software code, binaries, system libraries, dependencies, system tools, and/or any other components or settings needed to execute the application according to a particular model such as a declarative model of programming. In this way, the container is a self-contained execution enclosure for executing that portion of the application.

Unlike virtual machines, containers do not include operating system images. Instead, containers ride on a host operating system which is often light weight allowing for faster boot and utilization of less memory than a virtual machine. The containers can be individually replicated and scaled to accommodate demand. Management of the container (e.g., scaling, deployment, upgrading, health monitoring, etc.) is often automated by a container hosting platform (e.g., Kubernetes).

The container hosting platform can deploy containers on hosts (e.g., a virtual machine, physical hardware, etc.). The container hosting platform allocates compute resources (e.g., processor, memory, etc.) to the containers for executing containerized applications hosted within the containers. Containerized applications hosted within multiple containers may interact with one another and cooperate together. For example, a storage application within a container may access a deduplication application and an encryption application within other containers in order deduplicate and/or encrypt data managed by the storage application. The container hosting platform allocates processor and memory resources for executing the containerized application. However, persistent storage resources are provided to the containerized applications by an external distributed storage layer separate from and external to the container hosting platform. In this way, the external distributed storage layer provides storage services to the containerized applications hosted within the container hosting platform.

DESCRIPTION OF THE DRAWINGS

Embodiments of the present technology will be described and explained through the use of the accompanying drawings in which.

Figure 1A:
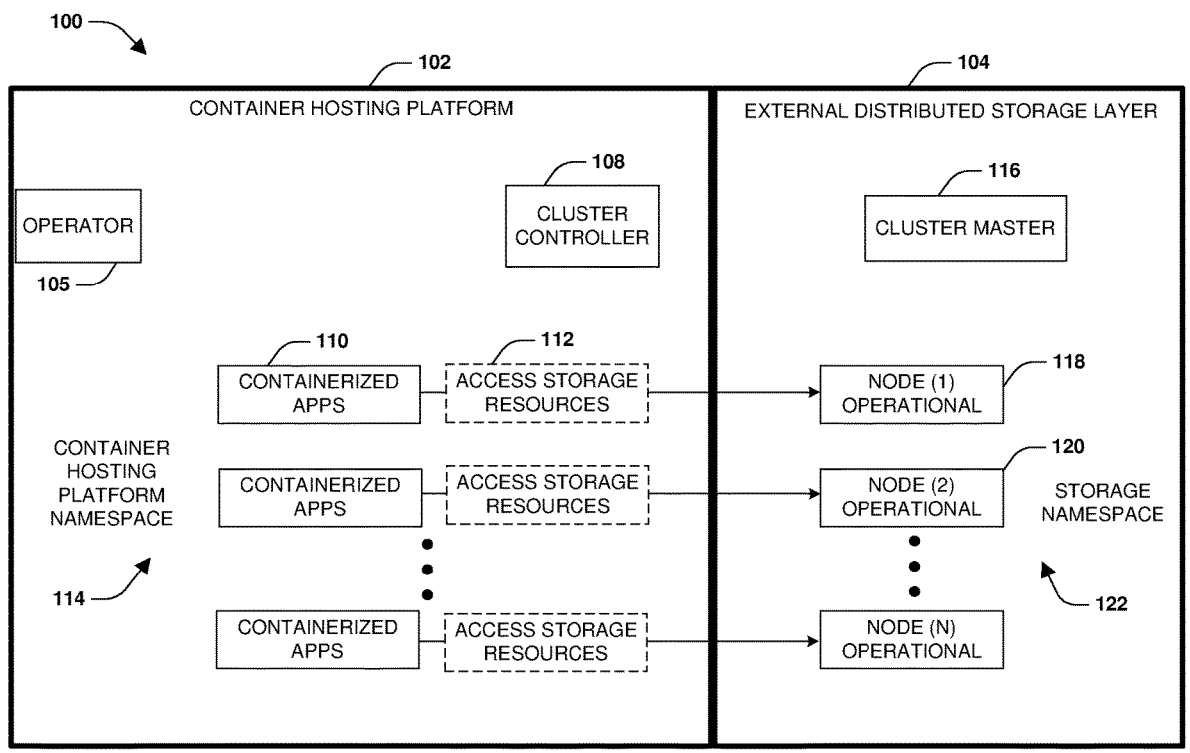
FIGS. 1A-1I are block diagrams illustrating an embodiment of upgrading an external distributed storage layer in accordance with an embodiment of the present technology.

The drawings have not necessarily been drawn to scale. Similarly, some components and/or operations may be separated into different blocks or combined into a single block for the purposes of discussion of some embodiments of the present technology. Moreover, while the present technology is amenable to various modifications and alternative forms, specific embodiments have been shown by way of example in the drawings and are described in detail below. The intention, however, is not to limit the present technology to the particular embodiments described. On the contrary, the present technology is intended to cover all modifications, equivalents, and alternatives falling within the scope of the present technology as defined by the appended claims.

DETAILED DESCRIPTION

Various embodiments of the present technology relate to upgrading an external distributed storage layer. The demands on data center infrastructure and storage are changing as more and more data centers are transforming into private and hybrid clouds. Storage solution customers are looking for solutions that can provide automated deployment and lifecycle management, scaling on-demand, higher levels of resiliency with increased scale, and automatic failure detection and self-healing. To meet these objectives, a container-based distributed storage architecture can be leveraged to create a composable, service-based architecture that provides scalability, resiliency, and load balancing. The container-based distributed storage architecture may provide a scalable, resilient, software defined architecture that can be leveraged to be the data plane for existing as well as new web scale applications. The container-based distributed storage architecture may include a container hosting platform (e.g., Kubernetes).

Applications may be deployed as containers within the container hosting platform in a scalable and on-demand manner as containerized applications. In some embodiments, a file system service application may be hosted within a container that is managed by the container hosting platform. The file system service application may be accessed by clients in order to store and retrieve data managed by the file system service application, such as through a volume. In order to provide these containerized applications hosted by the container hosting platform with persistent physical storage, an external distributed storage layer is provided.

The external distributed storage layer may be hosted separate from and external to the container hosting platform. This provides the ability to tailor and configure the external distributed storage layer for managing distributed storage in an efficient manner. Nodes within the external distributed storage layer can provide storage services using the distributed storage to any type of computing environment, such as to the containerized applications hosted within the container hosting platform, applications and services hosted on servers or on-premise, and/or to other applications and services hosted within various types of cloud computing environments. Accordingly, the external distributed storage layer is composed of a plurality of nodes that are configured to manage the distributed storage. Each node may manage one or more storage devices that form the distributed storage that is accessible to the plurality of nodes of the external distributed storage layer.

The container hosting platform implements control plane logic that acts as an intermediary layer that facilitates, tracks, and manages nodes executing control plane operations requested by the containerized applications. Because the control plane logic is implemented within the container hosting platform, the control plane logic can leverage management functionality, job scheduling services, APIs, resources, dynamic resource allocation/scaling, and/or other functionality and services provided by the container hosting platform. In some embodiments, the control plane logic can be leveraged by an operator and a cluster controller within the container hosting platform to orchestrate an upgrade of the nodes within the external distributed storage layer.

The cluster controller is configured with functionality capable of facilitating communication between the container hosting platform (e.g., the containerized applications, the control plane logic, etc.) and the external distributed storage layer. Facilitating communication between the container hosting platform and the external distributed storage layer is difficult and non-trivial because the container hosting platform and the external distributed storage layer may utilize different namespaces, application programming interfaces, semantics, operating states, etc. In some embodiments, the container hosting platform (e.g., Kubernetes) may implement a declarative programming model. With the declarative programming model, a containerized application can describe a result without explicitly listing instructions, programming commands, or executable steps to achieve the result. In some embodiments, the containerized application may request the provisioning of a volume to use for persistent storage (e.g., provisioning of the volume using distributed storage of the external distributed storage layer). The request describes the volume, such as a name, size, and/or other attributes that the volume should have. However, the request does not comprise the programming commands or executable steps to actually create the volume, which may be needed by the external distributed storage layer to provision the volume within the distributed storage. In some embodiments, a volume provisioning command for provisioning the volume may be created by the containerized application by defining a custom resource for the volume to be provisioned. The custom resource is formatted according to the declarative programming model where attributes of the volume are defined within the custom resource, but the custom resource does not comprise the actual programming commands or executable steps that a node within the external distributed storage layer would need to execute for provisioning the volume.

In contrast, the external distributed storage layer may implement an imperative programming model. With the imperative programming model, a node expects and operates based upon programming commands or executable steps (e.g., statements that change a program's state) that are provided to the node for execution in order to accomplish a particular result. In some embodiments, the node expects and is capable of executing a particular sequence of programming commands or executable steps to provision the volume for the containerized application. However, the node is unable execute the request, defined by the containerized application accordingly to the declarative programming model, because the request does not contain the required programming commands or executable steps that the node needs in order to provision the volume. Accordingly, the cluster controller is capable of reformatting/translating commands between the two different programming models in order to facilitate communication between the container hosting platform and the external distributed storage layer (e.g., reformatting a request from the containerized application in the declarative programming model to a reformatted request formatted according to the imperative programming model that can be executed by the node). Thus, the cluster controller can be leveraged by components within the container hosting platform for performing operations related to the external distributed storage layer.

As provided herein, this innovation utilizes the cluster controller and a custom defined operator in order to orchestrate an upgrade process, from the container hosting platform, for upgrading nodes within the external distributed storage layer. The upgrade progress may also upgrade containerized applications within the container hosting platform (e.g., containerized storage applications that utilize storage service of the nodes for persisting data within the distributed storage managed by the nodes). Because the external distributed storage layer is non-native and external to the container hosting platform, orchestrating the upgrade of nodes within the external distributed storage layer using the cluster controller and the operator within the container hosting platform is difficult and non-trivial. In some embodiments where the container hosting platform is a Kubernetes platform, the upgrade of the nodes of the external distributed storage layer (e.g., upgrade of non-Kubernetes nodes that are not native to and are unknown to the Kubernetes platform) is difficult because Kubernetes components within the Kubernetes platform are externally orchestrating the upgrade of the nodes.

In order to remotely upgrade the nodes within the external distributed storage layer, the cluster controller is configured to translate/reformat upgrade instructions from the container hosting platform to the external distributed storage layer. The upgrade instructions are defined, by an operator hosted within the container hosting platform, through a node management custom resource (e.g., a Kubernetes custom resource that extends the Kubernetes platform beyond native Kubernetes functionality by allowing non-native custom resources to be defined). In some embodiments, the operator is a custom defined operator (e.g., a customized Kubernetes operator) that is custom configured with new functionality capable of upgrading the nodes of the external distributed storage layer. In some embodiments, Kubernetes operators are software extensions to the Kubernetes platform that make use of custom resources to manage containerized applications, and the Kubernetes operators follow Kubernetes principles. In some embodiments, the operator is implemented as a custom defined Kubernetes operators (a new implementation of a Kubernetes operator) that provides new functionality, not natively provided by existing Kubernetes operators, which can upgrade the external distributed storage layer. The operator is custom tailored to be capable of installing upgrades for the external distributed storage layer, and the cluster controller is custom tailored to communicate with the external distributed storage layer and track/verify progress of upgrading the nodes.

The upgrade process is protection domain (fault domain) aware so that nodes are upgraded in a specific manner in order to prevent a single point of failure situation. In particular, an upgrade sequence order with which to upgrade nodes is identified using rules (e.g., a protection domain rule) to ensure that there is at least two other nodes (or some other number) available to service client I/O operations while another node is being upgraded. If a first node fails while a second node is being upgraded, then a third node can take over for the first node. Thus, the upgrade process is non-disruptive to clients so that client access to data is not interrupted. The operator performing the upgrade process implements complex rules in order to be aware of and ensure that the upgrade is non-disruptive from start to finish. The operator is also capable of identifying and resolving problems that occur during upgrade.

In addition, various embodiments of the present technology provide for a wide range of technical effects, advantages, and/or improvements to computing systems and components. For example, various embodiments may include one or more of the following technical effects, advantages, and/or improvements: 1) a custom developed cluster controller capable of reformatting/translating commands between a container hosting platform and an external distributed storage layer so that the cluster controller can translate and implement upgrade commands from the container hosting platform to the external distributed storage layer for upgrading nodes of the external distributed storage layer; 2) a custom defined operator configured with functionality for orchestrating, from within the container hosting platform, the upgrade of nodes within the external distributed storage layer using an upgrade process implemented and track within the container hosting platform; 3) upgrading the nodes within the external distributed storage layer according an upgrade sequence order defined based upon protection domains and rules (e.g., a protection domain rule); 4) upgrading the nodes according to the upgrade sequence order so that nodes are upgraded in a non-disruptive manner that does not affect client access to data; 5) implementing and tracking progress of upgrading the nodes using a node management custom resource used by the operator and the cluster controller; 6) populating, by the operator, the node management custom resource with information that can be used by the cluster controller to reformat/translate commands as reformatted commands that are transmitted to the external distributed storage layer for upgrading nodes; 7) populating, by the cluster controller, the node management custom resource with information regarding progress of the upgrade process; 8) orchestrating the upgrade of the nodes of the external distributed storage layer and the upgrade of containerized applications of the container hosting platform as a single orchestrated upgrade process orchestrated by the operator and the cluster controller; 9) upgrading the operator as a new operator tailored to perform a current upgrade process for the external distributed storage layer; and/or 10) the creation and use of a node management custom resource that is used to facilitate communication between the operator and the cluster controller so that complex APIs and other communication protocols do not need to be implemented.

In some embodiments of upgrading an external distributed storage layer, a deployment configuration containing information about a new version of the external distributed storage layer is identified. In some embodiments, the deployment configuration is a deployment .yaml file. The deployment configuration includes a custom resource definition specification that can be used to create and/or update a custom resource definition. The custom resource definition defines the node management custom resource utilized by the operator and cluster controller to implement and track the upgrade. The deployment configuration may include an upgrade operator image that is applied to an operator deployment specification to upgrade the operator. In this way, the deployment configuration is applied to update custom resource definitions, role-based access controls, and the operator deployment specification for the operator. In some embodiments, a check is performed to ensure that merely 1 instance of the operator and cluster controller are running at the same time for performing the upgrade, otherwise, additional instances are terminated.

Once the deployment configuration has been applied, pre-checks are performed to ensure that the external distributed storage layer is eligible for upgrade. In some embodiments, a pre-check is performed to ensure that the external distributed storage layer is in an operational state. The operational state is identified by evaluating a status field within a cluster custom resource object maintained within the container hosting platform to define and track a cluster of nodes within the external distributed storage layer. When the cluster controller retrieves operational state information from the external distributed storage layer, the cluster controller populates the operational state information into the status field of the cluster custom resource object.

In response to determining that the external distributed storage layer is operational (e.g., the nodes to be upgraded and a cluster master that will perform the upgrade are operational), the operator compares the deployment configuration with current version information of nodes running within the external distributed storage layer (e.g., a current version of the external distributed storage layer and current versions of the nodes within the external distributed storage layer). If the external distributed storage layer is not at the desired version specified by the deployment configuration, then the upgrade is initiated. In some embodiments, a condition is set within the container hosting platform (e.g., a Kubernetes condition) to indicate that the upgrade is in progress.

The operator iterates through and upgrades the nodes of the external distributed storage layer one node at a time. As part of upgrading a node, the operator creates a node management custom resource within the container hosting platform for the node. The operator sets a field within the node management custom resource to either node (e.g., the node is operational and serving client I/O), maintenance mode (e.g., the node has been transitioned into a maintenance mode where the node is no longer serving client I/O), or upgrade (e.g., the node is currently being upgraded or has been upgraded but has not yet been transitioned into an operational state for serving client I/O). The field may be set based upon whether volumes hosted by the node or other related data paths need to be moved.

Once the node management custom resource is created, the cluster controller issues a command to the external distributed storage layer to place the node in a maintenance mode where the node will no longer services client I/O. If the external distributed storage layer returns success, then the field within the node management custom resource is set to the maintenance mode. If the external distributed storage layer returns a failure, then a container hosting platform condition (e.g., a Kubernetes condition) is generated to indicate the failure.

Once the node is in the maintenance mode, the operator starts upgrading a container hosting the node. An uninstaller job (e.g., an uninstaller Kubernetes job) is created to stop the container, delete a root file system (e.g., a root file system used by the node to store data within the distributed storage), and retain a directory used to persist configurations of the node. Once the uninstaller job completes, another job is created to perform changes needed for upgrading the container to a new version and persisting the changes. After the changes are performed and persisted, the operator creates an installer job (e.g., an installer Kubernetes job) to copy a newer version of the root file system to the container, retain the directory with the persisted configurations in an unmodified state, and start the container. Once the container is started, the node is operating according to the upgraded version and can utilize the persisted configurations for operation. Once the installer job completes, the node management custom resource is deleted. Additionally, a command is sent to the external distributed storage layer to transition the node out of the maintenance mode for serving client I/O operations.

Once all nodes are upgraded, the external distributed storage layer is at the desired version specified by the deployment configuration. A cluster version of the external distributed storage layer is set to the upgraded version only if all nodes were successfully upgraded and are running at the upgraded version. If the deployment configuration and/or upgrade process including an upgrade for the containerized applications within the container hosting platform, then the container hosting platform is utilized for upgrading the containerized applications.

FIGS. 1A-1I are block diagrams illustrating an embodiment of upgrading an external distributed storage layer 104 in accordance with an embodiment of the present technology. In some embodiments, a computing environment 100 includes one or more hosts (e.g., physical hardware, virtual machines, etc.) across which a container hosting platform 102 (e.g., Kubernetes or another environment configured to host containerized applications, virtual machines, containers, etc.) and the external distributed storage layer 104 are hosted. The container hosting platform 102 hosts containerized applications that execute within containers that may be managed by pods. When a container is created for executing a containerized application, the container is allocated compute resources (e.g., CPU and memory resources) by the container hosting platform 102 for executing the containerized application. However, the container hosting platform 102 may provide minimal to no persistent storage resources for large scale, long term storage of client data. Accordingly, an external distributed storage layer 104 provides persistent storage services to the containerized applications within the container hosting platform 102. The external distributed storage layer 104 may include a first node 118, a second node 120, and/or other nodes of a cluster that provide containerized applications and other clients with the ability to store data within distributed storage managed by the nodes. In some embodiments, the first node 118 and/or other nodes may provide containerized applications 110 with access 112 to storage resources of the distributed storage managed by the external distributed storage layer 104.

The container hosting platform 102 and the external distributed storage layer 104 are separate computing environment. In some embodiments, the container hosting platform 102 and the external distributed storage layer 104 are separate computing environment even though the containerized applications within the container hosting platform 102 and the nodes of the external distributed storage layer 104 may be stored across the same hosts of the computing environment 100 (e.g., the same virtual machines, physical hardware, etc.). In some embodiments, the container hosting platform 102 may have no knowledge or understanding of the external distributed storage layer 104, and thus is unable to identify, communicate with, and/or access the nodes of the external distributed storage layer 104. The container hosting platform 102 and the containerized applications may be hosted within (constrained to) a container hosting platform namespace 114 that is different than (e.g., incompatible with) a storage namespace 122 within which the external distributed storage layer 104 and nodes are hosted (constrained). The storage namespace 122 and the container hosting platform namespace 114 may implemented different (incompatible) application programming interfaces, semantics, operating states, commands, communication protocols, etc. The difference (incompatibilities) between storage namespace 122 and the container hosting platform namespace 114 makes communicating and interacting with the external distributed storage layer 104 from within the container hosting platform 102 difficult and non-trivial.

Accordingly, a cluster controller 108 is configured and deployed within the container hosting platform 102 for reformatting/translating commands/instructions between the container hosting platform 102 and the external distributed storage layer 104. The cluster controller 108 is configured with functionality that can convert commands formatted according to a declarative programming model supported by the container hosting platform 102 into reformatted commands formatted according to an imperative programming model supported by the external distributed storage layer 104, and vice versa. In some embodiments of converting commands, a volume provisioning command may be created by a containerized application within the container host platform 102 by defining a custom resource definition for a volume to be provisioned. The custom resource definition is formatted according to the declarative programming model where attributes of the volume are defined within the custom resource definition, but the custom resource definition does not comprise the actual programming commands or executable steps that a node of the external distributed storage layer 104 would need to execute in order to provision the volume. Accordingly, the cluster controller 108 is configured with functionality capable of retrieving the attributes from the custom resource definition and utilizing those attributes to construct a reformatted command with programming commands or executable steps that the node can execute to provision the volume with those attributes. This solves issues where the container hosting platform 102 and the external distributed storage layer 104 utilize different programming models.

In some embodiments, the external distributed storage layer 104 may support an imperative programming model. Thus, the nodes of the external distributed storage layer 104 may be capable of executing commands (formatted according to the imperative programming model), such as commands comprising programming instructions or executable steps. In some embodiments, a snapshot command formatted according to the imperative model may include programming instructions or executable steps that a node can execute in order to create a snapshot. Because the external distributed storage layer 104 may not support the declarative programing model used by the containerized applications of the container hosting platform 102, the nodes of the external distributed storage layer 104 may be unable to process commands defined by the containerized applications. The cluster controller 108 is provided for reformatting commands between the imperative programming model and the declarative programming model in order to facilitate communication and execution of commands between the containerized applications, an operator 105, and/or other components hosted within the container hosting platform 102 and the nodes of the external distributed storage layer 104. In this way, the cluster controller 108 is configured to reformat/convert commands formatted according to the declarative programming model supported by the container host platform 102 into reformatted commands formatted according to the imperative programming model supported by the external distributed storage layer 104, and vice versa.

In some embodiments of the cluster controller 108 reformatting commands, the cluster controller 108 may receive a command formatted according to the declarative programming model (e.g., the command may be defined through a custom resource such as a node management custom resource 128 created by the operator 105 for orchestrating an upgrade of the nodes within the external distributed storage layer 104). The cluster controller 108 interprets the command to determine an intent of the command (e.g., a specified outcome, an objective of the command, a result that the command is to achieve, a purpose of the command, etc.). In some embodiments, the command has the intent for a volume to be provisioned. In some embodiments, the command has the intent for an upgrade to be applied to a node within the external distributed storage layer 104. The intent may be identified based upon parameters, text, and/or other information within the command (e.g., parsed from a custom resource such as the node management custom resource 128). In some embodiments, the command indicates that a volume with a particular name and size is to be provisioned, but does not include instructions for how to provision the volume. In some embodiments, an algorithm or text parsing function may be used to parse the command (e.g., parse the custom resource) to identify a specified outcome of the command. In some embodiments where the command is to upgrade the node, the cluster controller 108 compares the intent of the command to upgrade the node against a current state of the node (e.g., is the node in a state that is ready for being upgraded), and issues reformatted commands to a cluster master 116 for upgrading the first node.

In some embodiments where the command is a provisioning command to provision the volume, a reformatted command may change a current state for the volume to a provisioning state to indicate that the volume is currently being provisioned. The reformatted commands may comprise instructions that can be executed by a node or the cluster master 116 of the external distributed storage layer 104 to provision the volume (or instructions to upgrade the first node 118 if the command is an upgrade command defined through the node management custom resource 128). The reformatted commands may be imperative programming commands supported by the external distributed storage layer 104. In this way, the cluster controller 108 routes the imperative programming commands to the node or the cluster master 116 of the external distributed storage layer 104 for execution. The imperative programming commands may be run as jobs by the node or the cluster master 116. The cluster controller 108 may monitor the progress of the jobs. If the cluster controller 108 detects that a job has failed, then the cluster controller 108 may retry the job. In some embodiments, the reformatted commands (imperative programming commands) as transmitted as representational state transfer (REST) application programming interface (API) calls to REST API endpoints associated with the cluster master 116 and/or the nodes of the external distributed storage layer 104

In some embodiments of reformatting a command defined through a custom resource (e.g., the node management custom resource 128), the cluster controller 108 extracts information from a custom resource, which is used to construct executable operations, functions, and/or other imperative programming steps for inclusion within a reformatted command that can be executed by the a node and/or the cluster master 116.

In some embodiments, a custom defined operator 105 is configured and deployed within the container hosting platform 102. The operator 105 is configured to orchestrate an upgrade process from within the container hosting platform 102 in order to upgrade a node or a cluster of nodes within the external distributed storage layer 104. The operator 105 is a custom defined operator (e.g., a customized Kubernetes operator) that is custom configured/tailored with new functionality capable of upgrading the nodes of the external distributed storage layer 104. In some embodiments where the operator 105 is a Kubernetes operator and the container hosting platform 102 is a Kubernetes platform, the Kubernetes operator is implemented as a software extension to the Kubernetes platform, which makes use of custom resources (e.g., the node management custom resource 128) to perform the upgrade process. In some embodiments, the operator 105 is implemented as a custom defined new implementation of a Kubernetes operator that provides new functionality that can upgrade the nodes of the external distributed storage layer 104. The operator 105 is custom tailored to be capable of installing upgrades for the external distributed storage layer 104, and the cluster controller 108 is custom tailored to communicate with the external distributed storage layer 104 and track and verify progress of the upgrade process.

Figure 1B:
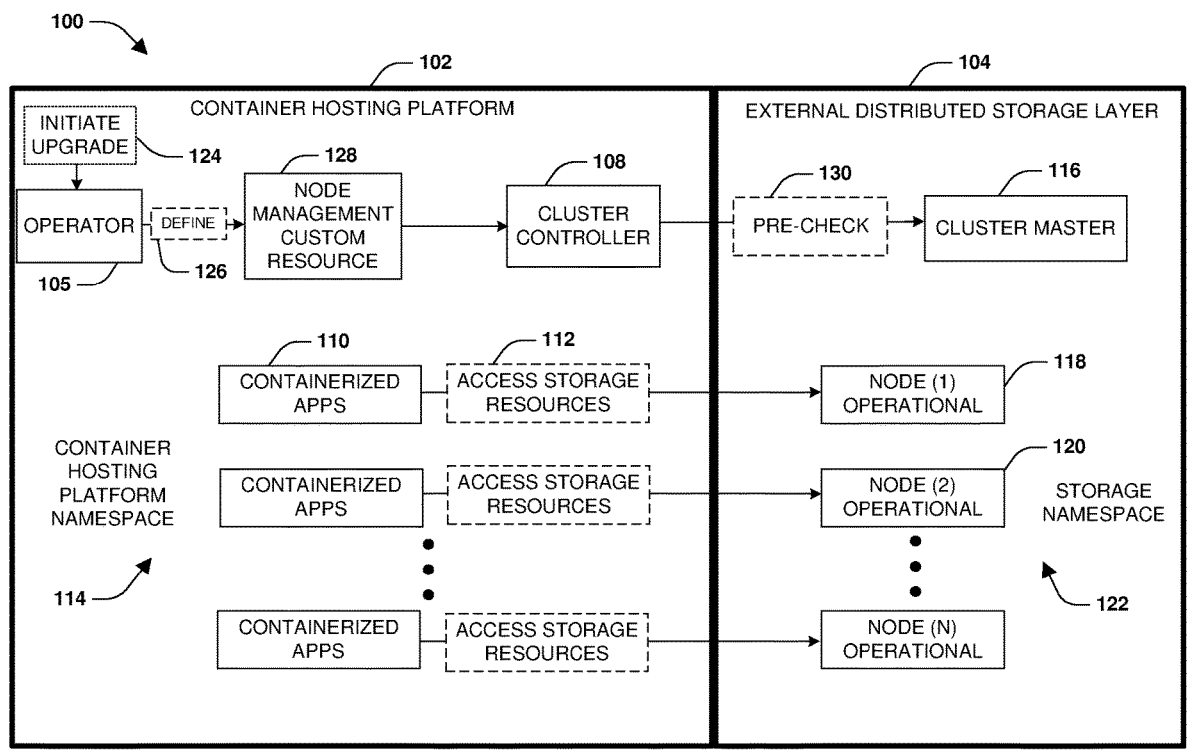

The operator 105 may receive an initiate upgrade instruction 124 that triggers the operator 105 to initiate the upgrade of one or more nodes within the external distributed storage layer 104, as illustrated by FIG. 1B. In some embodiments, the initiate upgrade instruction 124 specifies or includes a deployment configuration. In some embodiments, the deployment configuration includes an upgraded operator image. The upgraded operator image can be used to create an upgraded version of the operator 105 that is tailored to perform the current upgrade process for the nodes within the external distributed storage layer 104. Accordingly, a container hosting platform server of the container hosting platform 102 is instructed to shut down the current instance of the operator 105. The upgraded operator image is applied to an operator deployment specification to upgrade the operator 105. Once upgraded, the operator 105 is started in an upgraded state based upon the upgraded operator image being applied to the operator deployment specification. In some embodiments, the deployment configuration can be applied within the container hosting platform 102 to role-based access controls (RBACs) that are used to control access to resources within the container hosting platform 102 and/or the external distributed storage layer 104.

The deployment configuration may include a custom resource definition specification. The custom resource definition specification can be applied to create or update a custom resource definition. The operator 105 uses the custom resource definition to define 126 the node management custom resource 128 within the container hosting platform 102. The node management custom resource 128 is a custom resource (e.g., a custom defined Kubernetes custom resource used to provide functionality not natively provided by Kubernetes) used by the operator 105 and the cluster controller 108 to orchestrate and track progress of the upgrade of the nodes within the external distributed storage layer 104. The node management custom resource 128 may be used to facilitate communication between the operator 105 and the cluster controller 108 so that complex APIs and other communication protocols do not need to be implemented. Instead, the operator 105 and/or the cluster controller 108 can populate information and commands into the node management custom resource 128 in order to track and/or convey that information or commands amongst one another. In some embodiments, the operator 105 may populate the node management custom resource 128 with a command related to performing the upgrade process, which triggers the cluster controller 108 to create a reformatted command that is transmitted to the external distributed storage layer 104 for execution. In this way, the node management custom resource 128 is used for orchestrating the upgrade process between the operator 105 and the cluster controller 108.

In some embodiments, a pre-check 130 is performed based upon a determination that the upgrade process is to be implemented. The pre-check 130 may be performed to identify an operational status of the external distributed storage layer 104. The operational status may indicate whether the external distributed storage layer 104, the cluster master 116, and/or each node within the external distributed storage layer 104 is operational, has degraded performance, has failed (e.g., a node has failed, and thus a failover is performed to reassign aggregates and data IPs used by clients to access the aggregates from the failed node to a different node), is experience a network connectivity outage, etc. The operational status may be populated within a status field of a cluster custom resource and/or the node management custom resource 128 maintained within the container hosting platform 102. The cluster custom resource may be used to define and track the operational status and other information related to a plurality of nodes of a cluster within the external distributed storage layer 104, while the node management custom resource 128 is tailored to track the operation status of the node being upgraded. In some embodiments of performing the pre-check 130, the cluster controller 108 queries an application programming interface (API) of a cluster endpoint within the external distributed storage layer 104 (e.g., an API endpoint associated with the cluster master 116 that may track operational status information of nodes within the external distributed storage layer 104) in order to obtain/retrieve the operational status. The operational status may be populated into the cluster custom resource and/or the node management custom resource 128 by the cluster controller 108 so that the operator 105 can read the cluster custom resource and/or the node management custom resource 128 in order to obtain the operational status.

Figure 1C:
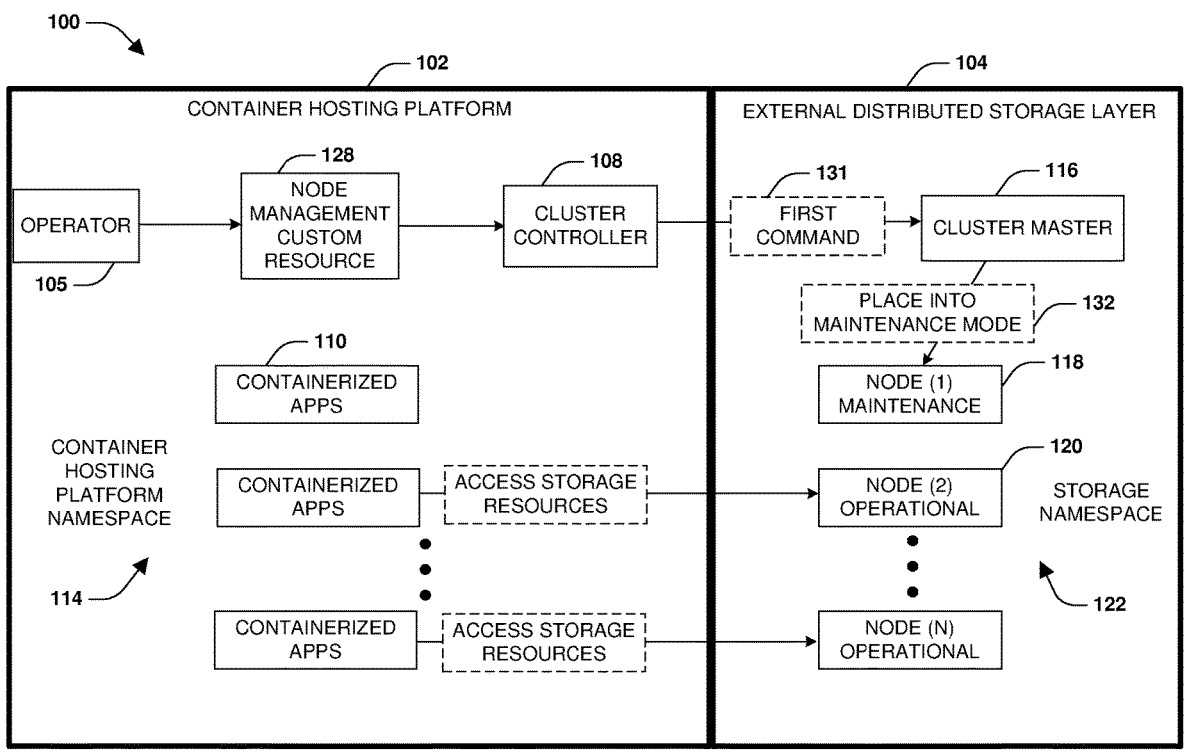

The operator 105 may trigger the cluster controller 108 to generate a first command 131 (e.g., a reformatted command having a format that can be interpreted by the external distributed storage layer 104) associated with performing the upgrade process, as illustrated by FIG. 1C. In some embodiments, the cluster controller 108 is triggered to generate the first command 131 in response to the node management custom resource 128 being created. In some embodiments, the cluster controller 108 is triggered to generate the first command 131 in response to the operator 105 populating information or a command into the node management custom resource 128. The cluster controller 108 reads the information or command from the node management custom resource 128, which triggers the cluster controller 108 to generate the first command 131 (e.g., the cluster controller 108 reformates a command populated by the operator 105 into the node management custom resource 128 into a reformatted command as the first command 131). The operator 105 may populate the information or command into the node management custom resource 128 based upon the pre-check 130 identifying the operational status as indicating that the nodes to be upgraded are operational and healthy. In some embodiments, the cluster controller 108 is triggered to generate the first command 131 in response to the pre-check 130 identifying the operational status as indicating that the nodes to be upgraded are operational and healthy.

The first command 131 may indicate that the first node 118 is to be upgraded. The first command 131 may instruct the cluster master 116 to place 132 the first node 118 into a maintenance mode. While in the maintenance mode, the first node 118 no longer services client I/O operations. Client I/O operations of the containerized applications 110 that were previously being serviced by the first node 118 may be re-routed to a different node not currently being upgraded. In some embodiments of transitioning the first node 118 into the maintenance mode, logical interfaces connecting the first node 118 to other nodes within the external distributed storage layer 104 are removed.

Figure 1D:
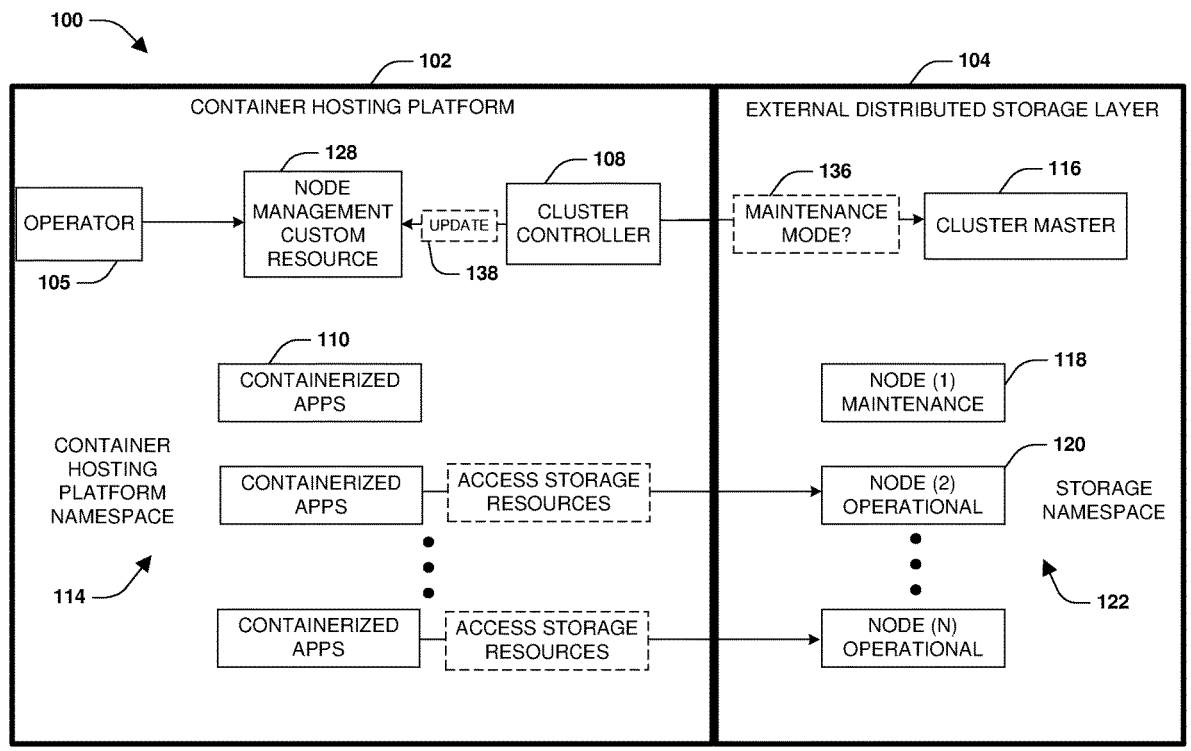

The cluster controller 108 may poll or query 136 the external distributed storage layer 104, such as the cluster master 116, to determine whether the first node 118 has been placed into the maintenance mode, as illustrated by FIG. 1D. Once the cluster controller 108 determines that the first node 118 has been placed into the maintenance mode, the cluster controller 108 updates 138 the node management custom resource 128 with an indication that the first node 118 is now in maintenance mode.

Figure 1E:
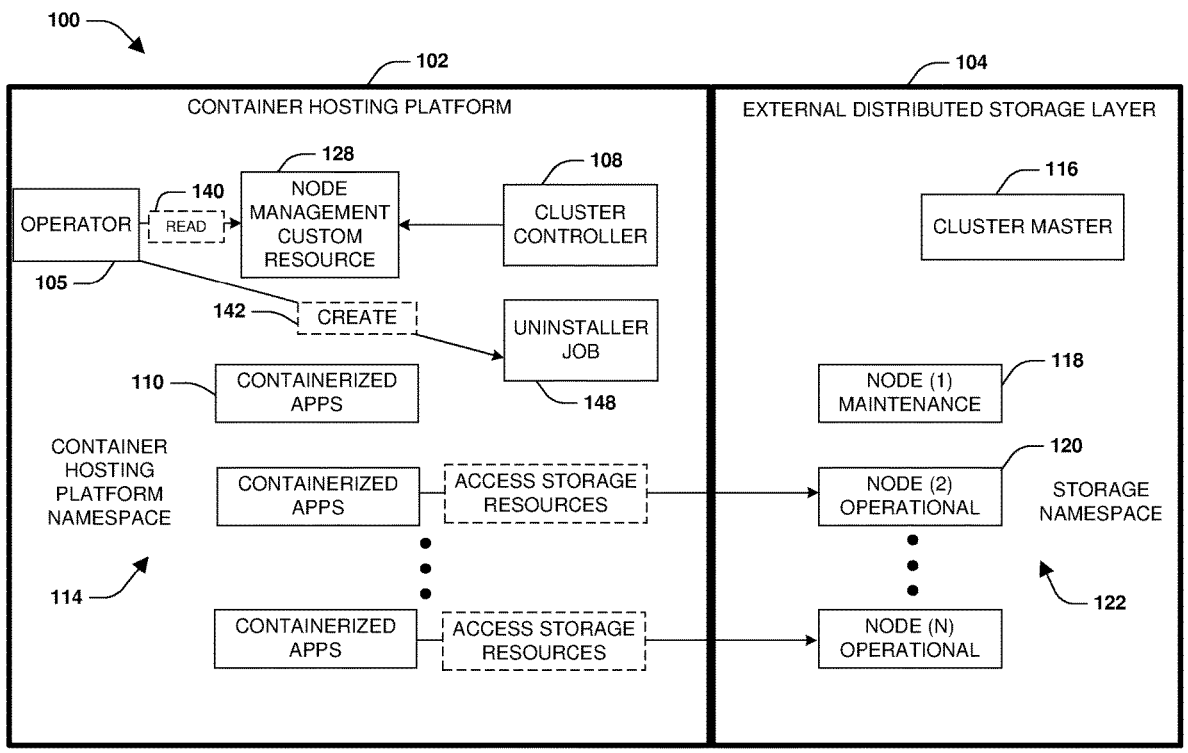

The operator 105 may read 140 the node management custom resource 128 and detect that the first node 118 is in the maintenance mode, as illustrated by FIG. 1E. Identifying the first node 118 as being in the maintenance mode triggers the operator 105 to facilitate upgrade of the first node 118. As part of upgrading the first node 118, a container hosting the first node 118 may be stopped. That is, the nodes within the external distributed storage layer 104 may be hosted within containers. The cluster master 116 or another component within the external distributed storage layer 104 may be instructed (e.g., by the operator 105, by the cluster controller 108, by an uninstaller job 148 created 142 by the operator 105, etc.) to stop the container within which the first node 118 is hosted. A current base image for the first node 118 may be replaced with an upgraded base image corresponding to an upgraded version to which the nodes are being upgraded. In some embodiments, the upgraded base image may be defined through the deployment configuration, and is provided to the cluster master 116 or other component within the external distributed storage layer 104 for upgrading the first node 118. The upgraded base image may be provided to the external distributed storage layer 104 by the operator 105, an installer job 154 created 153 by the operator 105, or the cluster controller 108 for replacing the current base image of the first node 118. The container may be restarted using the upgraded base image. In this way, the container now hosts the upgraded version of the first node 118.

Figure 1F:
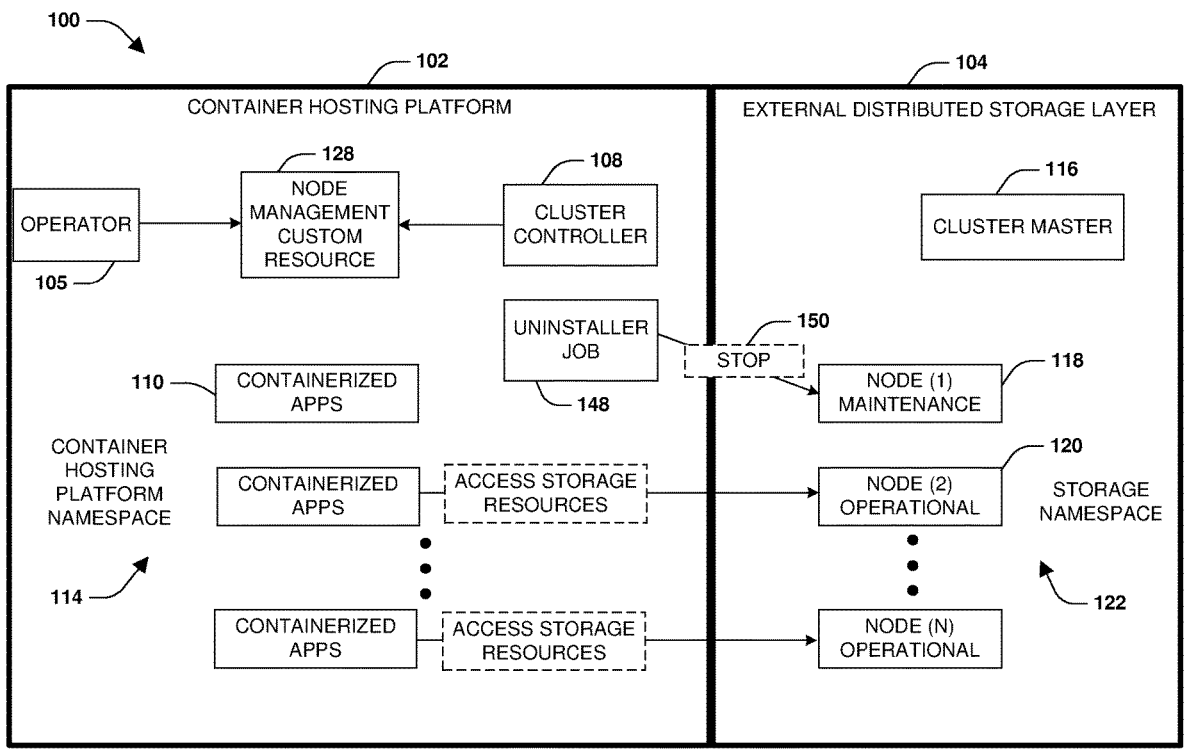

In some embodiments of upgrading the first node 118, the operator 105 may create 142 an uninstaller job 148 to perform one or more operations that are part of upgrading the first node 118, as illustrated by FIG. 1E. The uninstaller job 148 may be run within the container hosting platform 102 (e.g., a Kubernetes job running within Kubernetes). In some embodiments, the uninstaller job 148 may utilize the cluster controller 108 to transmit commands (e.g., commands reformatted by the cluster controller 108) to the external distributed storage layer 104. The uninstaller job 148 may stop the container host the first node 118, such as by transmitting a stop command 150 (e.g., a reformatted stop command created by the cluster controller 108 according to the imperative programming model) to the cluster master 116 to stop the container, as illustrated by FIG. 1F. The uninstaller job 148 may delete a root file system of the first node 118, such as by transmitting a delete command (e.g., a reformatted delete command created by the cluster controller 108 according to the imperative programming model) to the cluster master 116 to delete the root file system of the first node. The uninstaller job 148 may retain a directory used to persist configurations associated with the first node 118, such as by transmitting a persist command (e.g., a reformatted persist command created by the cluster controller 108 according to the imperative programming model) to the cluster master 116 to persistently store or retain the directory within the external distributed storage layer 104.

Figure 1G:
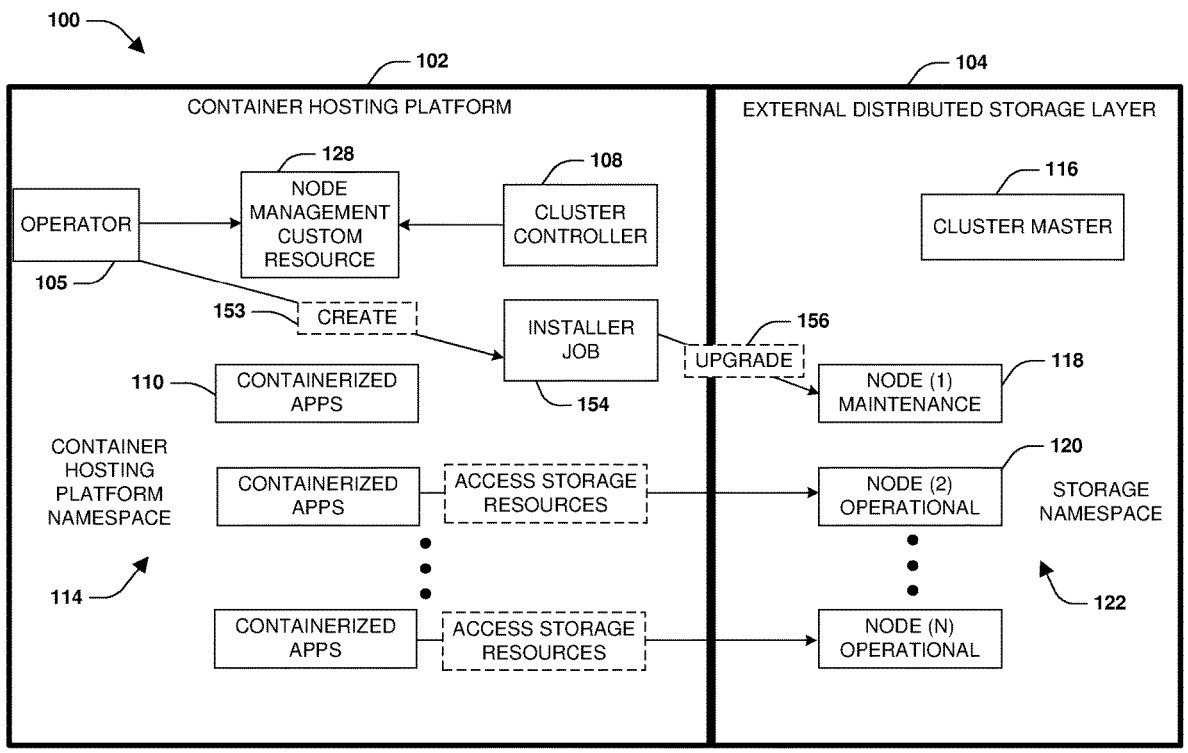

In some embodiments of upgrading the first node 118, the operator 105 may create 153 an installer job 154 to perform one or more operations that are part of upgrading 156 the first node 118, as illustrated by FIG. 1G. The installer job 154 may copy the upgraded base image (e.g., defined though the deployment configuration) as an upgraded root file system for the first node 118. In some embodiments, the upgraded base image may be transmitted by the installer job 154 (e.g., transmitted through the cluster controller 108) to the cluster master 116 to apply as the upgraded root file system. In this way, the upgraded root file system is used by the upgraded version of the first node 118 once the container is restarted. The upgraded version of the first node 118 will utilize the retained/persisted directory for accessing and/or applying the persisted configurations of the first node 118.

Figure 1H:
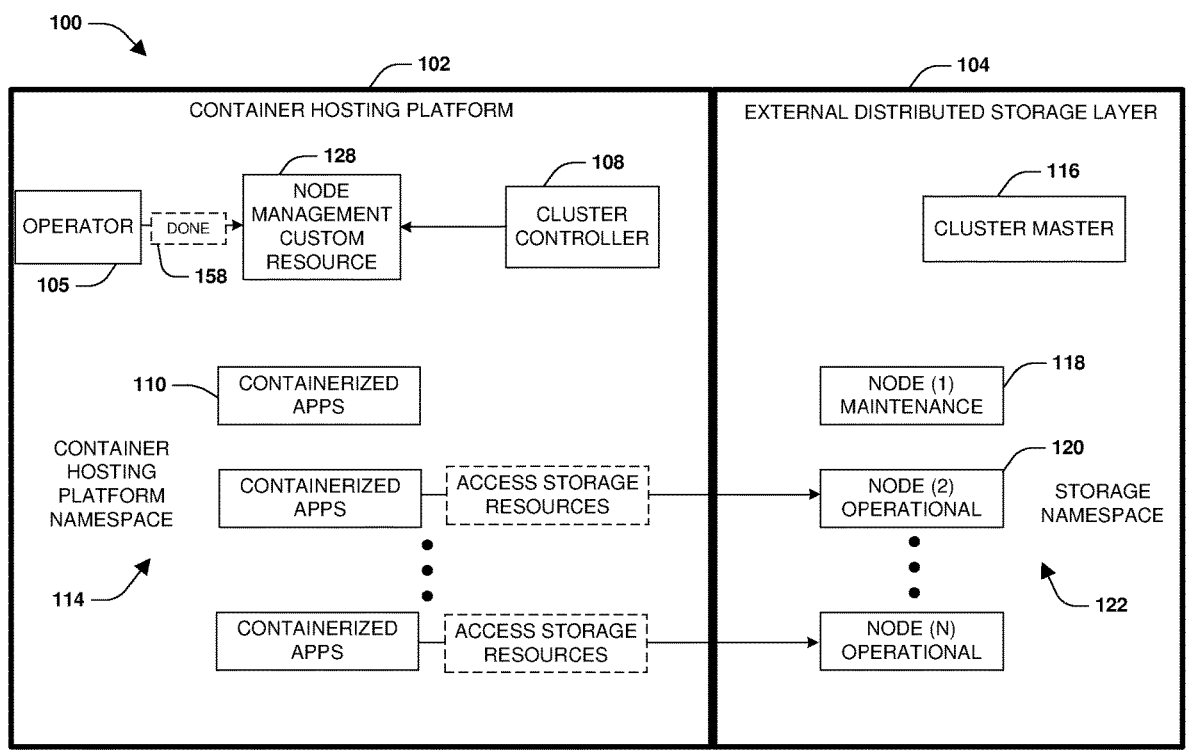
Figure 1I:
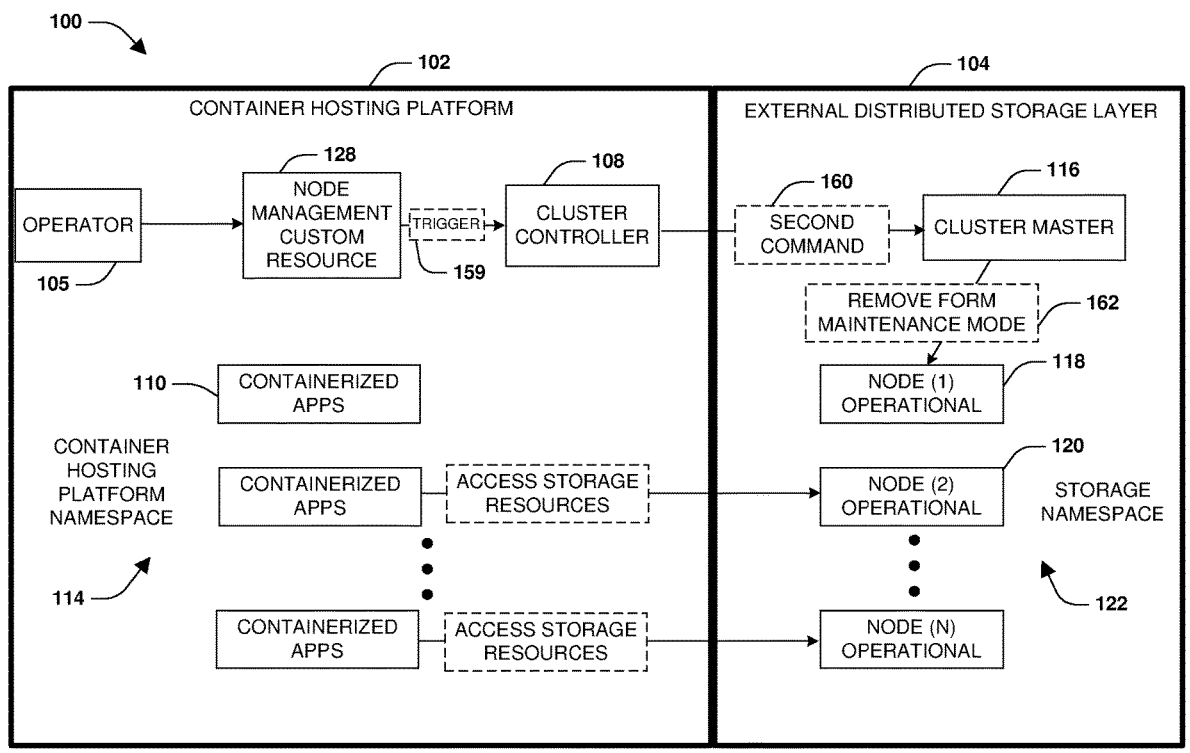

In response to the operator 105 upgrading the first node 118 (e.g., the installer job 154 providing an indication of success), the operator 105 may update the node management custom resource 128 with information that the upgrade is done 158 and that the first node 118 is to be transitioned out of the maintenance mode, as illustrated by FIG. 1H. The operator 105 updating the node management custom resource 128 with information that the upgrade is done 158 triggers 159 the cluster controller 108 to transmit a second command 160 to the cluster master 116, as illustrated by FIG. 1I. The second command 160 instructs the cluster master 116 to remove 162 the first node 118 from the maintenance mode so that the first node 118 is operational for servicing client I/O operations. The removed logical interfaces may be replaced with new logical interfaces. In this way, the first node 118 is successfully upgraded and operational.

In some embodiments of operations performed by the cluster master 116 within the external distributed storage layer 104 to upgrade the first node 118, the cluster master 116 performs a cluster health check for nodes within the external distributed storage layer 104 (e.g., as part of the pre-check 130 or as a separate health check). The cluster health check may be triggered based upon a command received from the cluster controller 108. The first node 118 may be upgraded based upon the cluster health check indicating that there is at least one replica node (e.g., a node maintained as a replica or failover partner of the first node 118, a node within a same protection domain as the first node 118, etc.) that is operational. If there is not at least one replica node that is operational and capable of taking over the processing the client I/O operations while the first node 118 is being upgraded, then the first node 118 is not upgraded and/or is not transitioned into the maintenance mode, and the cluster master 116 returns a failure indicator to the cluster controller 108. If the first node 118 is to be upgraded, then the cluster master 116 quiesces client I/O directed to the first node 118 (e.g., queues or redirects client I/O operations to other nodes such as a replica node for processing). The cluster master 116 evacuates data of a non-volatile random access memory (NVRAM) used by the node to log client I/O operations before the client I/O operations are persisted to the distributed storage of the external distributed storage layer 104 (e.g., logged client I/O operations are executed and persisted to the distributed storage). Once the NVRAM is evacuated, the cluster master 116 stops the container hosting the first node 118, and upgrades the first node 118.

In some embodiments, the upgrade process may be implemented as part of a cluster upgrade that upgrade a cluster of nodes within the external distributed storage layer 104. The upgrade process may be implemented by the operator 105 to upgrade nodes, a single node at a time, so that when one node is being upgraded, at least one other node (e.g., a replica node, a node within a same protection domain, etc.) is operational and processing client I/O operations.

In some embodiments, the containerized applications are part of a storage software suite that provides storage services to clients, such as the ability to store data within volumes stored within the distributed storage of the external distributed storage layer 104, encrypt data, compress data, deduplicate data, redundantly store data, perform backup and restore operations, migrate data, create snapshots, etc. Once the cluster upgrade has successfully completed, the containerized applications may also be upgraded within the container hosting platform 102.

Figure 2:
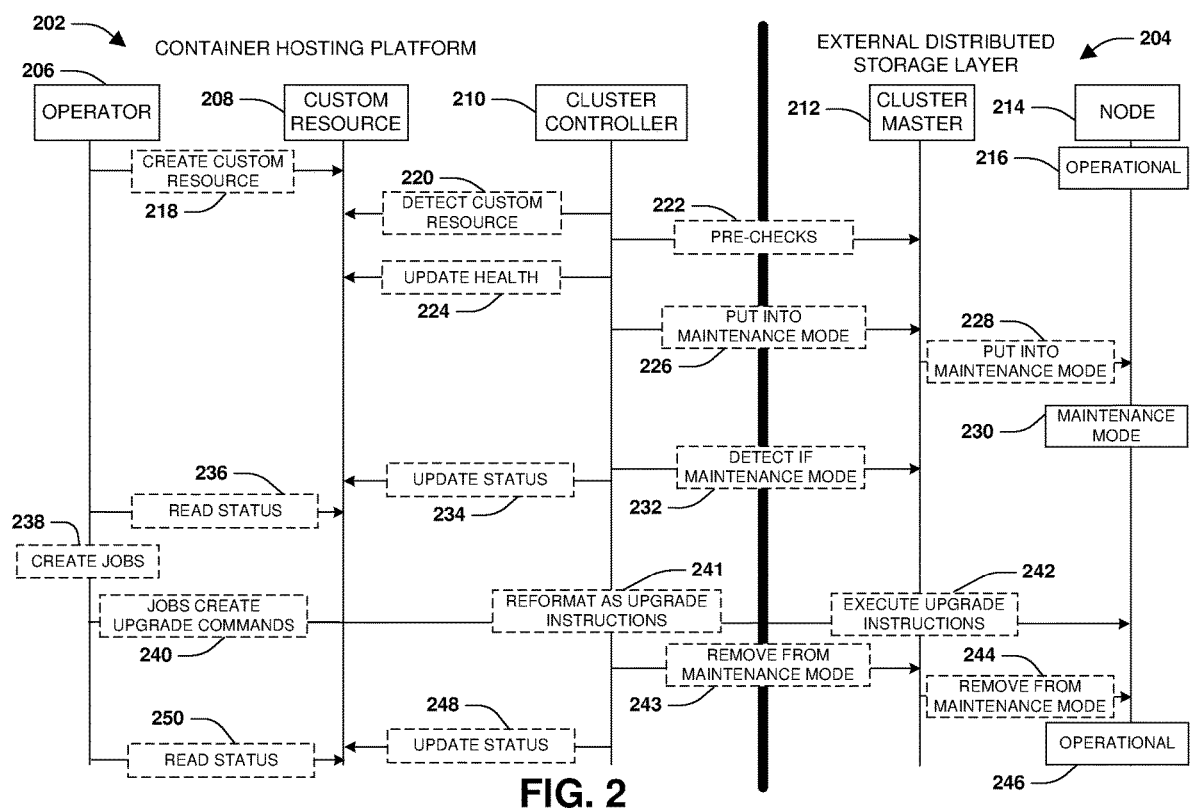
FIG. 2 is a sequence diagram illustrating an embodiment of upgrading an external distributed storage layer in accordance with various embodiments of the present technology.

FIG. 2 is a sequence diagram illustrating an embodiment of upgrading an external distributed storage layer 204 in accordance with various embodiments of the present technology. An operator 206 and a cluster controller 210 are hosted within a container hosting platform 202. The operator 206 is configured to orchestrate an upgrade process to upgrade a node 214 and/or other nodes within the external distributed storage layer 204. The operator 206 initializes the upgrade process by creating 218 a custom resource 208 within the container hosting platform 202. The operator 206 and the cluster controller 210 may communicate and/or orchestrate the upgrade by writing information into and reading information from the custom resource 208. The cluster controller 210 may detect 220 that the operator 206 created the custom resource 208, which triggers the cluster controller 210 to perform pre-checks 222 to determine whether the external distributed storage layer 204, the cluster master 212, and/or the node 214 are operational. In some embodiments, the pre-checks 222 determine that the node 214 is operational 216 and can be upgraded. The cluster controller 210 may update 224 the custom resource 208 with the health information determined by the pre-checks 222.

In response to the custom resource 208 being created and the node 214 being identified as operational 216 by the pre-checks 222, the cluster controller 210 is triggered to instruct 226 the cluster master 212 to put 228 the node 214 in a maintenance mode 230. While in the maintenance mode 230, the node 214 no longer services client I/O operations from clients such as I/O operations from containerized applications hosted within the container hosting platform 202. The cluster controller 210 may periodically query/poll the external distributed storage layer 204 to detect 232 whether the node 214 is in the maintenance mode 230. In response to the cluster controller 210 detecting 232 that the node 214 is in the maintenance mode 230, the cluster controller 210 updates 234 status information within the custom resource 208 to indicate that the node 214 is in the maintenance mode 230.

The operator 206 may periodically read 236 information from the custom resource 208. In response to the operator 206 determining that the status information within the custom resource 208 indicates that the node 214 is in the maintenance mode 230, the operator 206 creates 238 an uninstaller job and/or an installer job hosted within the container hosting platform 202. The uninstaller job and the installer jobs create 240 upgrade commands for upgrading the node 214. The cluster controller 210 may reformat 241 the upgrade commands as upgrade instructions that can be interpreted and executed 242 by the cluster master 212 to upgrade the node 214. The upgrade instructions may instruct the cluster master 212 to stop a container hosting the node 214, evacuate data of an NVRAM (e.g., store content of the NVRAM to the distributed storage) used by the node 214 to log client I/O operations before the client I/O operations are persisted to distributed storage of the external distributed storage layer 204, upgrade the node by replacing a current base image for the node 214 with an upgraded base image (and/or replacing a root file system of the node 214), and restarting the container using the upgraded base image for hosting an upgraded version of the node 214.

In response to the cluster controller 210 detecting that the cluster master 212 successfully upgraded the node 214, the cluster controller 210 may update status information within the custom resource 208 to indicate that the node 214 has been updated. In response to the operator 206 determining that the node 214 was successfully upgraded (e.g., based upon the updated status information within the custom resource 208), the operator 206 may populate the custom resource 208 with information that triggers the cluster controller 210 to transmit 243 an instruction to the cluster master 212 to remove 244 the node 214 from being in the maintenance mode 230. In this way, the node 214 is transitioned from the maintenance mode 230 to an operational state 246 for processing client I/O operations. In response to the cluster controller 210 detecting that the node 214 is in the operational state 246, the cluster controller 210 may update 248 the status information within the custom resource 208 to indicate that the node 214 is in the operational state 246. The operator 206 may read 250 the status information from the custom resource 208 and determines that the node 214 has been successfully upgraded.

Figure 3:
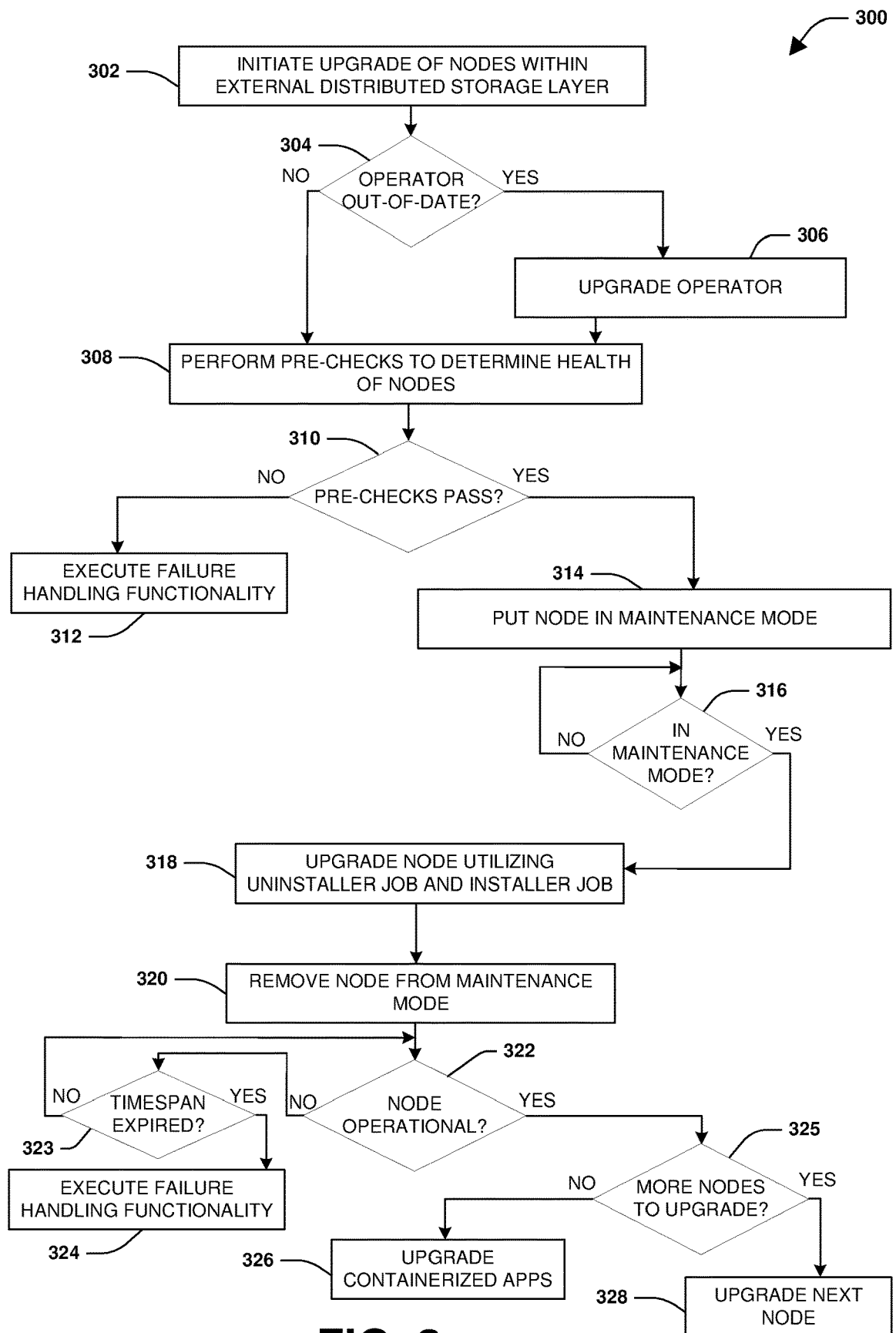
FIG. 3 is a flow chart illustrating an embodiment of upgrading an external distributed storage layer in accordance with various embodiments of the present technology.

FIG. 3 is a flow chart illustrating an embodiment of upgrading an external distributed storage layer in accordance with various embodiments of the present technology. During operation 302 of method 300, an upgrade of nodes within an external distributed storage layer is initiated by an operator and cluster controller hosted within a container hosting platform. As part of upgrading the nodes within the external distributed storage layer, a determination is made as to whether an operator is out-of-date for performing the upgrade, during operation 304 of method 300. If the operator is out-of-date, then the container hosting platform is instructed to shut down the operator, apply an upgraded operator image to an operator deployment specification to upgrade the operator, and start the operator in an upgraded state, during operation 306.

Once the operator is determine to be up-to-date for performing the upgrade of the nodes within the external distributed storage layer, pre-checks are performed to determine the health (operational status) of the nodes, during operation 308 of method 300. In some embodiments, the cluster controller may communicate with a cluster master within the external distributed storage layer in order to obtain the health of the nodes from the cluster master. During operation 310 of method 300, a determination is made as to whether the pre-checks passed or whether any of the nodes to be upgraded were determined to be unhealthy (e.g., failed, having degraded performance, lost network connectivity, have been failed over to a partner node, etc.). If any of the nodes were determined to be unhealthy, then the upgrade process may be aborted and an error may be returned or other failure handling functionality may be executed, during operation 312 of method 300.

If all nodes passed the pre-checks, then the nodes are upgraded one node at a time. As part of upgrading a node, the node is put into a maintenance mode, during operation 314 of method 300. The cluster controller may transmit a command to the cluster master to place the node into the maintenance mode where the node will no longer actively process client I/O operations such as I/O operations from containerized applications hosted within the container hosting platform. The cluster controller may periodically poll the external distributed storage layer to determine whether the node is now in the maintenance mode (e.g., client I/O operations may be quiesced, and logged client I/O operations within an NVRAM may be executed and persisted to the distributed storage as part of placing the node into the maintenance mode or subsequently during upgrade of the node, which may take time), during operation 316 of method 300.

Once the node is determined to be in the maintenance mode, the node is upgraded utilizing an uninstaller job and/or an installer job, during operation 318 of method 300. The operator may create the uninstaller job and the installer job as jobs hosted within the container hosting platform (e.g., Kubernetes jobs running within Kubernetes). The uninstaller job and the installer job create upgrade commands for upgrading the node. The cluster controller may reformat the upgrade commands as upgrade instructions that can be interpreted and executed by the cluster maser to upgrade the node. The upgrade instructions may instruct the cluster master to stop a container hosting the node, evacuate data of the NVRAM used by the node to log client I/O operations before the client I/O operations are persisted to distributed storage of the external distributed storage layer, upgrade the node by replacing a current base image for the node with an upgraded base image and/or replacing a root file system of the node, and restarting the container using the upgraded base image for hosting an upgraded version of the node.

Once the node has been upgraded, the cluster controller instructs the cluster master to remove the node from maintenance mode, during operation 320 of method 300. When the node is removed from the maintenance mode, the node is transitioned into an operational state for processing client I/O operations. During operation 322 of method 300, the cluster controller determines whether the node is operational such as by periodically querying/polling the external distributed storage layer for an operational status of the node. If the node has not become operational, then a determination is made as to whether a timespan for the node to become operational has expired, during operation 323 of method 300. If the timespan has not expired, then the cluster controller may continue to query/poll the external distributed storage layer for an operational status of the node. If the timespan has expired, then the upgrade process may be aborted or other failure handling functionality may be executed, during operation 324 of method 300.

If the node is determined to be operational within the timespan, then a determination is made by the operator as to whether there are more nodes to upgrade, during operation 325 of method 300. In some embodiments, a deployment specification may specify which nodes are to be upgraded as part of the upgrade process, such as a particular cluster of nodes. If there are no other nodes to upgrade (e.g., all nodes have been successfully upgraded), then containerized applications within the container hosting platform may be upgraded as part of the upgrade process (e.g., the containerized applications may be part of a storage software suite, which use the external distributed storage layer for persistent storage), during operation 326 of method 300. If there are other nodes to upgrade, then a next node is identified and upgraded, during operation 328 of method 300.

Figure 4:
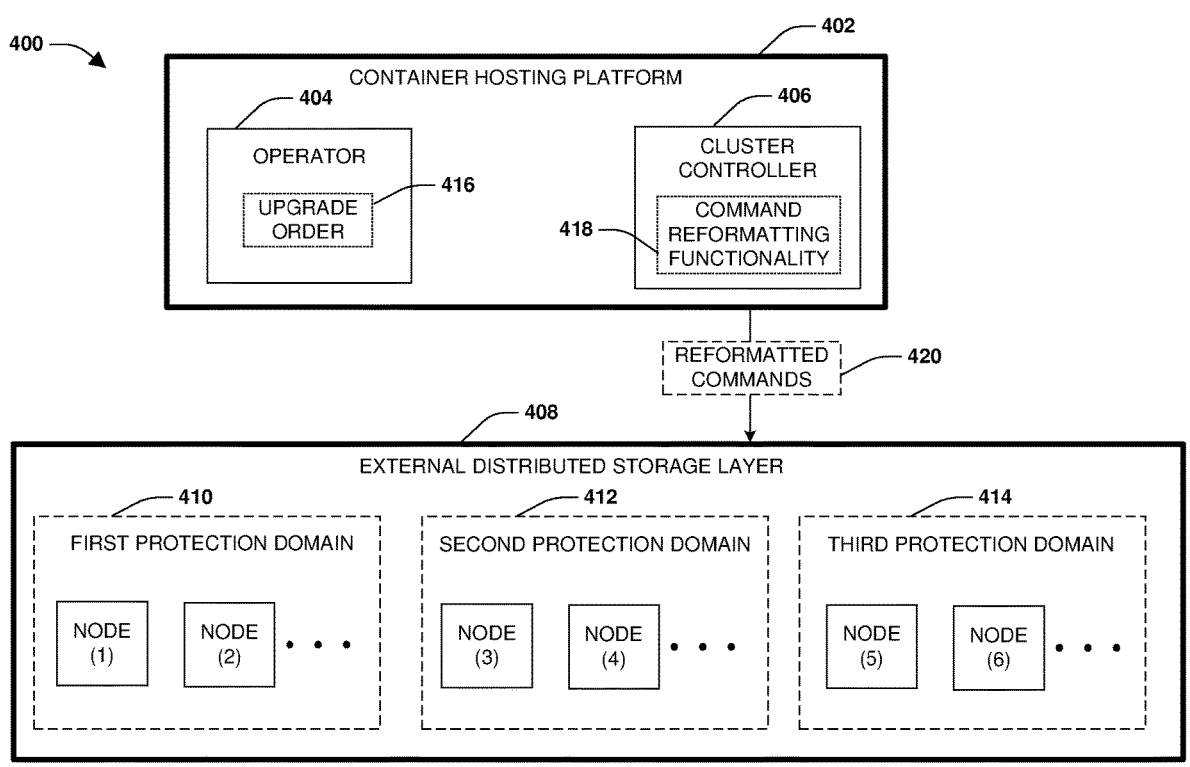
FIG. 4 is a block diagram illustrating an embodiment of upgrading nodes of an external distributed storage layer according to an upgrade sequence order in accordance with an embodiment of the present technology.

FIG. 4 is a block diagram illustrating an embodiment of upgrading nodes of an external distributed storage layer according to an upgrade sequence order in accordance with an embodiment of the present technology. An external distributed storage layer 408 of a computing environment 400 may host nodes that provide persistent storage services to clients, such as containerized applications within a container hosting platform 402 of the computing environment 400. Sets of nodes may be hosted within protection domains of the external distributed storage layer 408. In some embodiments, a first node, a second node, and/or other node are hosted within a first protection domain 410. A third node, a fourth node, and/or other nodes are hosted within a second protection domain 412. A fifth node, a sixth node, and/or other nodes are hosted within a third protection domain 414. A protection domain may be defined to encompass one or more nodes that are configured as failover partners such that if one node within a protection domain fails, has degraded performance, is taken out of service (e.g., a failover is being performed for load or performance balancing), or is being upgraded, then a cluster master can perform a failover to failover aggregates, volumes, and data IPs from the node to a failover partner node (e.g., a replica node maintained as a replication of the node). In this way, the failover partner node can serve client I/O operations in place of the node.

The container hosting platform 402 includes an operator 404 and a cluster controller 406 that work together to upgrade nodes within the external distributed storage layer 408. The operator 404 may implement a protection domain rule in order to determine an upgrade sequence order 416 with which to sequentially upgrade the nodes within the external distributed storage layer 408, a single node at a time. The protection domain rule may indicate that an initial pair of nodes of a protection domain cannot be sequentially upgraded. The protection domain rule may indicate that a final pair of nodes of the protection domain cannot be sequentially upgraded. The upgrade sequence order 416 may also be determined based upon a rule indicating that at least two nodes (e.g., at least two nodes within the same protection domain) are to be available to host a client volume at any given point in time during the upgrade of nodes within the external distributed storage layer 408. Thus, if a first node fails while a second node is being upgraded, then a third node can take over for the first node. In this way, the upgrade sequence order 416 is created to specify a sequential order with which nodes are to be upgraded within the external distributed storage layer 408, one node at a time (e.g., the upgrade sequence order 416 may specify an upgrade sequence order of the first node, then the fifth node, then the fourth node, etc.). As part of upgrading nodes according to the upgrade sequence order 416, the cluster controller 406 may utilize command reformatting functionality 418 to reformat/translate upgrade commands defined by the operation 404 (e.g., defined through a custom resource) into reformatted commands 420 that can be interpreted and executed by a cluster master of the within the external distributed storage layer 408 to upgrade the nodes.

Figure 5:
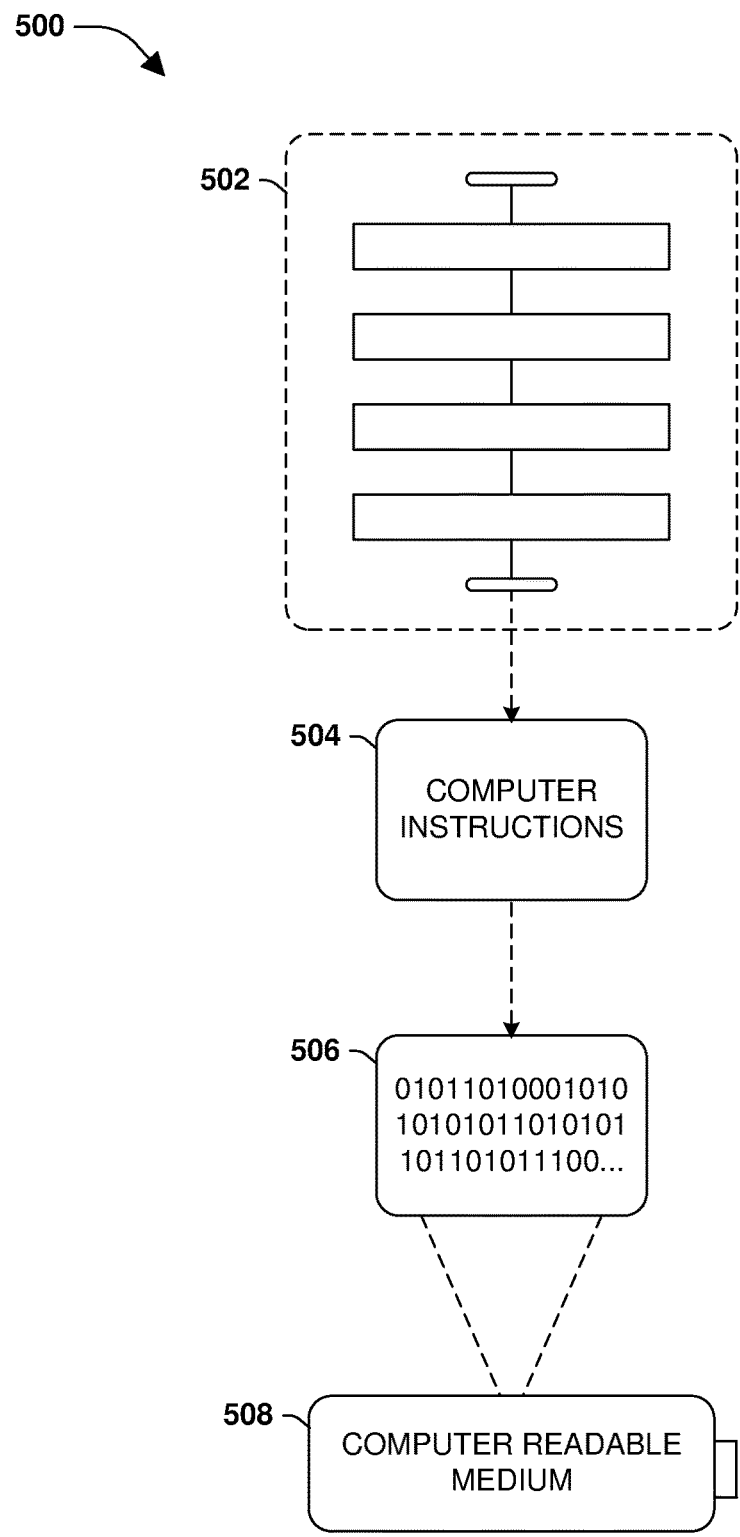
FIG. 5 is an example of a computer readable medium in which various embodiments of the present technology may be implemented.

FIG. 5 is an example of a computer readable medium 500 in which various embodiments of the present technology may be implemented. An example embodiment of a computer-readable medium or a computer-readable device that is devised in these ways is illustrated in FIG. 5, wherein the implementation comprises a computer-readable medium 508, such as a compact disc-recordable (CD-R), a digital versatile disc-recordable (DVD-R), flash drive, a platter of a hard disk drive, etc., on which is encoded computer-readable data 506. The computer-readable data 506, such as binary data comprising at least one of a zero or a one, in turn comprises processor-executable computer instructions 504 configured to operate according to one or more of the principles set forth herein. In some embodiments, the processor-executable computer instructions 504 are configured to perform at least some of the exemplary methods 502 disclosed herein, such as method 300 of FIG. 3, for example. In some embodiments, the processor-executable computer instructions 504 are configured to implement a system, such as at least some of the exemplary systems disclosed herein, such as computing environment 100 of FIG. 1 and/or computing environment 400 of FIG. 4, for example. Many such computer-readable media are contemplated to operate in accordance with the techniques presented herein.

In some embodiments, the described methods and/or their equivalents may be implemented with computer executable instructions. Thus, in some embodiments, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In some embodiments, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, magnetic tape, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   creating a node management custom resource defined through a container hosting platform for tracking an upgrade process performed by an operator and a cluster controller hosted within the container hosting platform to upgrade a node of a first set of nodes within a first protection domain in an external distributed storage layer external to the container hosting platform;
   determining an upgrade sequence order for upgrading the first set of nodes based upon a protection domain rule indicating that an initial pair of nodes of the first protection domain cannot be sequentially upgraded and a final pair of nodes of the first protection domain cannot be sequentially upgraded; and
   upgrading the first set of nodes according to the upgrade sequence order, wherein for the node:
      in response to the creation of the node management custom resource triggering the cluster controller to issue a first command to the external distributed storage layer to transition the node into a maintenance mode, updating the node management custom resource to indicate that the node is in the maintenance mode;
in response to the node management custom resource indicating that the node is in the maintenance mode, triggering the operator to upgrade the node according to the upgrade sequence order by stopping a container hosting the node, replacing a current base image for the node with an upgraded base image, and restarting the container using the upgraded base image; and
in response to the operator upgrading the node, updating the node management custom resource to trigger the cluster controller to issue a second command to the external distributed storage layer to transition the node out of the maintenance mode.

2. The method of claim 1, comprising:
generating, by the operator, an uninstaller job within the container hosting platform to stop the container, delete a root file system of the node, and retain a directory used to persist configurations associated with the node.

3. The method of claim 1, comprising:
generating, by the operator, an installer job within the container hosting platform to copy the upgraded base image as an upgraded root file system and retain a directory used to persist configurations associated with the node.

4. The method of claim 1, comprising:
hosting a second set of nodes within a second protection domain of the external distributed storage layer.

5. The method of claim 4, comprising:
applying the protection domain rule to determine the upgrade sequence order for upgrading the first set of nodes and the second set of nodes.

6. The method of claim 1, comprising:
determining the upgrade sequence order based upon a rule indicating that at least two nodes are available to host a client volume at any given point in time during the upgrade of the set of nodes.

7. The method of claim 1, comprising:
in response to receiving a deployment configuration including a custom resource definition specification, applying the custom resource definition specification to update a custom resource definition used to define the node management custom resource.

8. The method of claim 1, comprising:
in response to receiving a deployment configuration including an upgraded operator image, triggering an upgrade of the operator that includes:
instructing a container hosting platform server to shut down the operator;
applying the upgraded operator image to an operator deployment specification to upgrade the operator; and
starting the operator in an upgraded state based upon the upgraded operator image being applied to the operator deployment specification.

9. The method of claim 1, comprising:
in response to receiving a deployment configuration, applying the deployment configuration to role-based access controls maintained by the container hosting platform for controlling access to resources within at least one of the container hosting platform or the external distributed storage layer based upon roles.

10. The method of claim 1, comprising:
hosting containerized applications of the container hosting platform across a plurality of hosts, wherein the containerized applications and the container hosting platform are constrained to a container hosting platform namespace; and
hosting nodes of the external distributed storage layer across the plurality of hosts, wherein the nodes and the external distributed storage layer is constrained to a storage namespace separated from the container hosting platform namespace, wherein the storage namespace and the container hosting platform namespace implement different application programming interfaces, semantics, and operating states.

11. The method of claim 1, wherein the external distributed storage layer implements a first type of application programming interfaces, semantics, and operating states, wherein the container hosting platform implements a second type of application programming interfaces, semantics, and operating states, and wherein the method comprises:
reformatting, by the cluster controller, commands between the first and second types of application programming interfaces, semantics, and operating states in order to facilitate communication between the container hosting platform and the external distributed storage layer.

12. The method of claim 1, comprising:
in response to determining that the upgrade process is to be implemented, performing, by the operator, a pre-check to identify an operational status of the external distributed storage layer, wherein the operational status is populated within a status field of a cluster custom resource maintained within the container hosting platform to define the external distributed storage layer, and wherein the cluster controller queries an application programming interface of a cluster endpoint within the external distributed storage layer for obtaining the operational status for the operator.

13. The method of claim 1, comprising:
transitioning the node into the maintenance mode by removing logical interfaces connecting the node to other nodes within the external distributed storage layer.

14. The method of claim 1, comprising:
implementing the upgrade process as part of a cluster upgrade to upgrade nodes of the external distributed storage layer a single node at a time such that a first node is available to process client I/O operations while a second node is being upgraded.

15. A system, comprising:
an external distributed storage layer of nodes hosted across a plurality of hosts, wherein the nodes provide storage services to containerized applications of a container hosting platform maintained within a container orchestration namespace separated from a storage namespace of the external distributed storage layer; and
the container hosting platform hosted across the plurality of hosts, wherein the container hosting platform includes:
a node management custom resource created for tracking an upgrade process performed to upgrade a node of a first set of nodes within a protection domain in the external distributed storage layer;
a cluster controller that reformats commands, between a first format used by the container orchestration namespace and a second format used by the storage namespace, for facilitating communication between the container hosting platform and the external distributed storage layer; and an operator that:
determines an upgrade sequence order for upgrading the first set of nodes based upon a protection domain rule indicating that an initial pair of nodes of the protection domain cannot be sequentially upgraded and a final pair of nodes of the protection domain cannot be sequentially upgraded; and upgrades the first set of nodes according to the upgrade sequence order, wherein for the node, the operator: creates and modifies the node management custom resource to trigger the cluster controller to transmit commands to the external distributed storage layer to transition the node into a maintenance mode and upgrade the node according to the upgrade sequence order by stopping a container hosting the node, replacing a current base image for the node with an upgraded base image, and restarting the container using the upgraded base image.

16. The system of claim 15, wherein the external distributed storage layer comprises:
a cluster master that quiesces client I/O directed to the node, evacuates data of a non-volatile random access memory used by the node, stops the container, and upgrades the node based upon a command received from the cluster controller.

17. The system of claim 15, wherein the external distributed storage layer comprises:
a cluster master that perform a cluster health check for the nodes of the external distributed storage layer based upon a command received from the cluster controller, wherein the node is upgraded if the cluster health check indicates that at least one replica node, maintained as a replica of the node, is operational, and wherein the node is not upgraded if the health check indicates that there is not at least one replica node that is operational.

18. The system of claim 15, wherein the operator:
generates an uninstaller job within the container hosting platform to stop the container, delete a root file system of the node, and retain a directory used to persist configurations associated with the node; and
in response to the uninstaller job completing, generates an installer job within the container hosting platform to copy the upgraded base image as an upgraded root file system and retain the directory used to persist configurations associated with the node.

19. The system of claim 15, wherein a second set of nodes are hosted within a second protection domain of the external distributed storage layer, and wherein the operator:
applies the protection domain rule to determine the upgrade sequence order for upgrading the first set of nodes and the second set of nodes.

20. A non-transitory machine readable medium comprising instructions, which when executed by a machine, causes the machine to:
create a node management custom resource defined through a container hosting platform for tracking an upgrade process to upgrade a node of a first set of nodes within a protection domain in an external distributed storage layer external to the container hosting platform;

determine an upgrade sequence order for upgrading the first set of nodes based upon a protection domain rule indicating that an initial pair of nodes of the protection domain cannot be sequentially upgraded and a final pair of nodes of the protection domain cannot be sequentially upgraded;

trigger, based upon creation of the node management custom resource, transmission of a first command to the external distributed storage layer to transition the node into a maintenance mode; and upgrade the first set of nodes according to the upgrade sequence order, wherein for the node:
update the node management custom resource to indicate that the node is in the maintenance mode;
in response to the node management custom resource indicating that the node is in the maintenance mode, trigger upgrade of the node according to the upgrade sequence order by stopping a container hosting the node, replacing a current base image for the node with an upgraded base image, and restarting the container using the upgraded base image; and
in response to upgrading the node, update the node management custom resource to trigger transmission of a second command to the external distributed storage layer to transition the node out of the maintenance mode.

* * * * *